(12) United States Patent
Wiklund et al.

(10) Patent No.: US 8,849,589 B2
(45) Date of Patent: Sep. 30, 2014

(54) MULTIVARIABLE PROCESS FLUID FLOW DEVICE WITH ENERGY FLOW CALCULATION

(75) Inventors: David E. Wiklund, Eden Prairie, MN (US); Lowell A. Kleven, Eden Prairie, MN (US)

(73) Assignee: Rosemount Inc., Eden Prairie, MN (US)

( * ) Notice: Subject to any disclaimer, the term of this patent is extended or adjusted under 35 U.S.C. 154(b) by 282 days.

(21) Appl. No.: 12/470,878

(22) Filed: May 22, 2009

(65) Prior Publication Data

US 2009/0292484 A1 Nov. 26, 2009

Related U.S. Application Data

(60) Provisional application No. 61/055,730, filed on May 23, 2008.

(51) Int. Cl.
G01F 1/34 (2006.01)
G01F 1/50 (2006.01)
G01F 1/88 (2006.01)
G01F 1/36 (2006.01)
G01F 15/04 (2006.01)
G01K 17/06 (2006.01)

(52) U.S. Cl.
CPC G01F 1/363 (2013.01); G01F 1/50 (2013.01); G01F 1/88 (2013.01); G01F 15/046 (2013.01); G01K 17/06 (2013.01)
USPC .................................. 702/45; 702/47; 702/50

(58) Field of Classification Search
USPC .............................. 702/45, 47, 50; 73/861.351
See application file for complete search history.

(56) References Cited

U.S. PATENT DOCUMENTS

| 3,393,562 A | 7/1968 | Breedlove ........................ 73/190 |
| 3,564,912 A | 2/1971 | Malone et al. ................... 73/194 |
| 3,687,119 A * | 8/1972 | Hoogeboom .............. 123/27 GE |
| 3,701,280 A | 10/1972 | Stroman .......................... 73/194 |

(Continued)

FOREIGN PATENT DOCUMENTS

| DE | G 91 09 176.4 | 10/1991 |
| EP | 0 063 685 A1 | 3/1982 |

(Continued)

OTHER PUBLICATIONS

A. W. Crook, Profitting From Low-Grade Heat, 1994, The Institution of Electrical Engineers, London, United Kingdom, The Watt Commite on Energy No. 26, pp. 169.*

(Continued)

*Primary Examiner* — Janet Suglo
*Assistant Examiner* — Michael Dalbo
(74) *Attorney, Agent, or Firm* — Westman, Champlin & Koehler, P.A.

(57) ABSTRACT

A process fluid flow device includes a power supply module, a process communication module, a processor and measurement circuitry. The process communication circuitry is coupled to the power supply module and to the processor. The measurement circuitry is operably coupleable to plurality of process variable sensors to obtain an indication of differential pressure, static pressure and process fluid temperature. The processor is configured to compute process fluid mass flow, and to use the static pressure and process fluid temperature to obtain an energy per unit mass value relative to the process fluid and to provide an energy flow indication.

14 Claims, 3 Drawing Sheets

(56) References Cited

U.S. PATENT DOCUMENTS

| | | | |
|---|---|---|---|
| 3,783,684 A | 1/1974 | De Livois | 73/190 |
| 4,103,551 A | 8/1978 | Lynnworth | 73/194 |
| 4,238,825 A | 12/1980 | Geery | 364/510 |
| 4,249,164 A | 2/1981 | Tivy | 340/870.3 |
| 4,403,296 A | 9/1983 | Prosky | 364/573 |
| 4,414,634 A | 11/1983 | Louis et al. | 364/510 |
| 4,419,898 A | 12/1983 | Zanker et al. | 73/861.02 |
| 4,437,164 A | 3/1984 | Branch, III | 364/571 |
| 4,446,730 A | 5/1984 | Smith | 73/301 |
| 4,485,673 A | 12/1984 | Stern | 73/304 |
| 4,528,855 A | 7/1985 | Singh | 73/721 |
| 4,562,744 A | 1/1986 | Hall et al. | 73/861.02 |
| 4,576,036 A * | 3/1986 | Huang et al. | 73/29.01 |
| 4,598,381 A | 7/1986 | Cucci | 364/558 |
| 4,602,344 A | 7/1986 | Ferretti et al. | 364/509 |
| 4,677,841 A | 7/1987 | Kennedy | 73/30 |
| 4,796,651 A | 1/1989 | Ginn et al. | 137/8 |
| 4,799,169 A | 1/1989 | Mims | 364/510 |
| 4,825,704 A | 5/1989 | Aoshima et al. | 73/861.42 |
| 4,864,462 A | 9/1989 | Madou et al. | 361/280 |
| 4,881,412 A | 11/1989 | Northedge | 73/861.04 |
| 4,888,953 A * | 12/1989 | Fukayama et al. | 60/657 |
| 4,958,938 A | 9/1990 | Schwartz et al. | 374/208 |
| 4,986,127 A | 1/1991 | Shimada et al. | 73/714 |
| 5,035,140 A | 7/1991 | Daniels et al. | 73/290 |
| 5,058,437 A | 10/1991 | Chaumont et al. | 73/861.21 |
| 5,201,581 A | 4/1993 | Vander Heyden et al. | 374/36 |
| 5,226,728 A * | 7/1993 | Vander Heyden | 374/36 |
| 5,365,795 A | 11/1994 | Brower, Jr. | 73/861.65 |
| 5,495,769 A | 3/1996 | Broden et al. | 73/718 |
| 5,606,513 A | 2/1997 | Louwagie et al. | 364/510 |
| 5,772,323 A | 6/1998 | Felice | 374/127 |
| 5,857,777 A | 1/1999 | Schuh | 374/172 |
| 5,949,695 A | 9/1999 | Snell | 708/290 |
| 6,029,527 A | 2/2000 | Seitz et al. | 73/861.52 |
| 6,182,019 B1 | 1/2001 | Wiklund | 702/182 |
| 6,612,186 B1 | 9/2003 | Patten et al. | 73/861.04 |
| 6,643,610 B1 | 11/2003 | Kleven et al. | 702/183 |
| 2004/0221660 A1* | 11/2004 | Dutton et al. | 73/861.354 |
| 2005/0210998 A1 | 9/2005 | Dimarco et al. | 73/861.22 |
| 2006/0144163 A1 | 7/2006 | Friberg | 73/861.52 |
| 2007/0244654 A1* | 10/2007 | Ito et al. | 702/45 |
| 2008/0288182 A1* | 11/2008 | Cline et al. | 702/24 |

FOREIGN PATENT DOCUMENTS

| | | |
|---|---|---|
| EP | 0 214 801 A1 | 3/1987 |
| EP | 0 223 300 A2 | 5/1987 |
| JP | 61281956 | 12/1986 |
| NL | 1014749 | 9/2001 |
| WO | WO 88/01417 | 2/1988 |
| WO | WO 89/02578 | 3/1989 |
| WO | WO 89/04089 | 5/1989 |
| WO | WO 90/15975 | 12/1990 |
| WO | WO 91/18266 | 11/1991 |
| WO | WO 95/32405 | 11/1995 |
| WO | WO 97/04288 | 2/1997 |
| WO | WO 01/23972 | 4/2001 |
| WO | WO 0123972 A1 * | 4/2001 |

OTHER PUBLICATIONS

Haar et al., NBS/NRC Steam Tables, 1984, Hemisphere Publishing Corporation, pp. 26.*

Sanjay Kumar, Gas Production Engineering, Gulf Publishing Compnay, 1987, pp. 417.*

Neil Petchers, Combined Heating, Cooling, and Power Handbook, The Fairmont Press, Inc., Jan 1, 2003—Cogeneration of electric power and heat; pp. 65-72.*

Specification Summary, "TELETRANS™ 3508-10A Smart Differential Pressure Transmitter," (undated) Bristol Babcock, Inc., Watertown, CT, 06795, 10 pages.

Specification Summary, "TELETRANS™ 3508-30A Smart Differential Pressure Transmitter," (undated) Bristol Babcock, Inc., Watertown, CT, 06795, 11 pages.

Specification Summary, "AccuRate Advanced Gas Flow Computer, Model GFC 3308," (undated) Bristol Babcock, Inc., Watertown, CT, 06795, 12 pages.

Brochure: "Reduce Unaccounted-For Natural Gas with High-Accuracy Pressure Transmitters," Rosemount Inc. Measurement Division, Eden Prairie, Minnesota, ADS 3073, May 1991, pp. 1-4.

Technical Information Bulletin, "Liquid Level Transmitter Model DB40RL Sanitary Sensor Deltapilot," Endress+Hauser, Greenwood, Indiana, Sep. 1992, pp. 1-8.

"The Digitization of Field Instruments" W. Van Der Bijl, Jouranl A, vol. 32, No. 3, 1991, pp. 62-63 (No month).

"Single Chip Senses Pressure and Temperature," *Machine Design*, 64 May 21, 1992, No. 10, 1 page.

Product Data Sheet 4640, "Model 3201 Hydrostatic Interface Unit," Mar. 1992, Rosemount Inc., Eden Prairie, MN 55344, 8 pages.

Product Data Sheet 4638, "Model 3001CL Flush-Mount Hydrostatic Pressure Transmitter," Jul. 1992, Rosemount Inc., Eden Prairie, MN 55344, 3 pages.

"Flow Measurement," *Handbook of Fluid Dynamics*, V. Streeter, Editor-in-chief, published by McGraw-Hill Book Company, Inc. 1961, pp. 14-15 (No month).

"Precise Computerized In-Line Compressible Flow Metering," *Flow—Its Measurement and Control in Science and Industry*, vol. 1, Part 2, Edited by R. Wendt, Jr., Published by American Institute of Physics et al, (undated) pp. 539-540.

"Methods of Volume Measurement Using Tank-Gauging Devices Can Be Error Prone," F. Berto, *The Advantages of Hydrostatic Tank Gauging Systems*, undated reprint from *Oil & Gas Journal*, 7 pages.

"Hydrostatic Tank Gauging—Technology Whose Time Has Come," J. Berto, *Rosemount Measurement Division Product Feature*, undated reprint from *INTECH*, 2 pages.

"Pressure Sensor Gauge Tank Level and Fluid Density," *Rosemount Measurement Division Product Feature*, undated reprint from *Prepared Foods* (Copyright 1991 by Gorman Publishing Company), 2 pages (no month).

"A System Approach," by Dr. C. Ikoku, *Natural Gas Engineering*, 2 pages. (undated).

"Low Cost Electronic Flow Measurement System," *Tech Profile*, May 1993, Gas Research Institute, Chicago, IL, 2 pages.

"Development of an Integrated EFM Device for Orifice Meter Custody Transfer Applications," S.D. Nieberle et al., *American Gas Association Distribution/Transmission Conference & Exhibit*, May 10, 1993, 5 pages.

Advertisement, AccuRate Model 3308 Integral Smart DP/P/T Transmitter. (undated) Bristol Babcock, Inc., Watertown, CT, 06795, 1 page, (no date).

Advertisement, Model 3508 DP Transmitter, *Control Engineering*, Dec. 1992, Bristol Babcock, Inc., Watertown, CT, 06795, 1 page.

"Smart Transmitters Tear Up the Market," C. Polsonetti, *INTECH*, Jul. 1993, pp. 42-45.

"Numerical Recipes in C," by W. Press et al., Cambridge University Press, 1990, pp. 51-59 and 158-162.

"Numerical Recipes in Fortran," by W. Press et al., Cambridge University Press, 1992, pp. 650-651 and 664-665 (no month).

"Numerical Recipes in Fortran," by W. Press et al., Cambridge University Press, 1992, pp. 99-122.

"Model 3095 Flow Transmitter," Preliminary Product Information, Sep. 1993, Rosemount Inc., Eden Prairie, MN 55344, 11 pages.

"Signal Transmission Put on a Pedestal," *Control and Instrumentation*, Sep. 1976, vol. 6, No. 8, pp. 28-29.

Product Data Sheet PDS 4015, "Model 3095FT Flow Transmitters," by Rosemount Inc., Eden Prairie, MN 55344, Feb. 1994, pp. 1-15.

"Orifice Metering of Natural Gas and Other Related Hydrocarbon Fluid", Part 1, General Equations and Uncertainty Guidelines, American Gas Association, Report No. 3, American Petroleum Institute, API 14.3, Gas Processors Association, GPA 8185-90, Third Edition, Oct. 1990, A.G.A. Catalog No. XQ9017.

"Orifice Metering of Natural Gas and Other Related Hydrocarbon Fluid", Part 2, Specification and Installation Requirements, American Gas Association, Report No. 3, American Petroleum Institute,

(56) References Cited

OTHER PUBLICATIONS

API 14.3, Gas Processors Association, GPA 8185-90, Third Edition, Feb. 1991, A.G.A. Catalog No. XQ9104.

"Orifice Metering of Natural Gas and Other Related Hydrocarbon Fluid", Part 3, Natural Gas Applications, American Gas Association, Report No. 3, American Petroleum Institute, API 14.3, Gas Processors Association, GPA 8185-92, Third Edition, Aug. 1992, A.G.A. Catalog No. XQ9210.

"Orifice Metering of Natural Gas and Other Related Hydrocarbon Fluid", Part 4, Background, Development, Implementation Procedure, and Subroutine Documentation for Empirical Flange-Tapped Discharge Coefficient Equation, American Gas Association, Report No. 3, American Petroleum Institute, API 14.3, Gas Processors Association, GPA 8185-92, Third Edition, Oct. 1992, 2nd Printing Aug. 1995, A.G.A. Catalog No. XQ9211.

"Compressibility Factors of Natural Gas and Other Related Hydrocarbon Gases", AGA Transmission Measurement Committee Report No, 8, American Petroleum Institute MPMS Chapter 14.2, Gas Research Institute, Catalog No. XQ9212, Second Edition, Nov. 1992, 2nd Printing Jul. 1994.

Product Data Sheet "Rosemount 3051S Series of Instrumentation Scalable Pressure, Flow, and Level Solutions," by Rosemount Inc., Eden Prairie, MN 55344, Oct. 2008, pp. 1-59.

Quick Installation Guide Rosemount 3051SMV "Rosemount 3051S MultiVariable™ Transmitter; Rosemount 3051SF Series Flowmeter MultiVariable Transmitter," by Rosemount Inc., by Eden Prairie, MN 55344, Sep. 2008, pp. 1-48.

Quick Installation Guide Rosemount 3095 MultiVariable "Rosemount 3095 MultiVariable™ Mass Flow Transmitter with HART or FOUNDATION Fieldbus Protocol; Rosemount 3095 Mass Flowmeter Electronics," by Rosemount Inc., by Eden Prairie, MN 55344, Jan. 2005, pp. 1-20.

International Search Report and Written Opinion for International application No. PCT/US00/25923 dated May 14, 2001.

International Search Report and Written Opinion for international patent application No. PCT/US2009/045016, dated Aug. 24, 2009.

Baranov et al. "Method for Calculating the Quantity of Heat Transferred by Steam Flow in Mains," translated from Izmeritel'naya Tekhnika, No. 10, pp. 42-43, Oct. 1984.

Office Action from related Japanese patent application No. 2011510729 dated Mar. 21, 2012.

Office Action from related Chinese patent application No. 200980117314.7 dated Feb. 1, 2012.

Office Action from related Russian patent application No. 2010152551 dated Feb. 8, 2012.

Second Office Action from the corresponding Japanese patent application No. 2011-510729 dated Feb. 26, 2013.

Decision of Rejection (Final Rejection) dated Jul. 30, 2013 in Japanese Appln. No. 2011-510729, 4 pgs with English Translation.

\* cited by examiner

MULTIVARIABLE PROCESS FLUID FLOW DEVICE WITH ENERGY FLOW CALCULATION

CROSS-REFERENCE TO RELATED APPLICATION

The present application is based on and claims the benefit of U.S. provisional patent application Ser. No. 61/055,730, filed May 23, 2008, the content of which is hereby incorporated by reference in its entirety.

BACKGROUND

In industrial settings, control systems are used to monitor and control inventories of industrial and chemical processes and the like. Typically, the control system performs these functions using field devices distributed at key locations in the industrial process coupled to the control circuitry in the control room by a process control loop. The term "field device" refers to any device that performs a function in a distributed control or process monitoring system used in the measurement, control, and monitoring of industrial processes. Typically, field devices are characterized by their ability to operate outdoors for extended periods of time, such as years. Thus, a field device is able to operate in a variety of climatological extremes, including severe temperature extremes and extremes in humidity. Moreover, field devices are able to function in the presence of significant vibration, such as vibration from adjacent machinery. Further, field devices may also operate in the presence of electromagnetic interference.

One example of a field device is a multivariable process fluid flow device, such as that sold under the trade designation Model 3051 SMV Multivariable Transmitter by Emerson Process Management of Chanhassen, Minn. Multivariable process fluid flow devices can compute mass flow rate through differential producers for liquids and gases. For some flow applications, it is desirable to know the energy flow rate in addition to, or instead of, the mass flow rate. In particular, these needs arise in the areas of natural gas flow and steam or water flow. For natural gas, the energy content, or heating value, of the fluid is completely specified by the gas composition and represents the amount of energy available if the natural gas were completely combusted. The desired units for such applications are typically Btu/unit time or Megajoules/unit time. For steam or water flow (useful in energy balance calculations) the energy content, or enthalpy, of the fluid represents the amount of energy required to bring steam or water to the pressure and temperature conditions of the flow. The enthalpy is usually referenced to a specific set of pressure and temperature conditions such as the melting point of water at atmospheric conditions. The desired units for such applications are also typically Btu/unit time or Megajoules/unit time.

SUMMARY

A process fluid flow device includes a power supply module, a process communication module, a processor and measurement circuitry. The process communication circuitry is coupled to the power supply module and to the processor. The measurement circuitry is operably coupleable to plurality of process variable sensors to obtain an indication of differential pressure, static pressure and process fluid temperature. The processor is configured to compute process fluid mass flow, and to use the static pressure and process fluid temperature to obtain an energy per unit mass value relative to the process fluid and to provide an energy flow indication.

DETAILED DESCRIPTION OF ILLUSTRATIVE EMBODIMENTS

Figure 1:
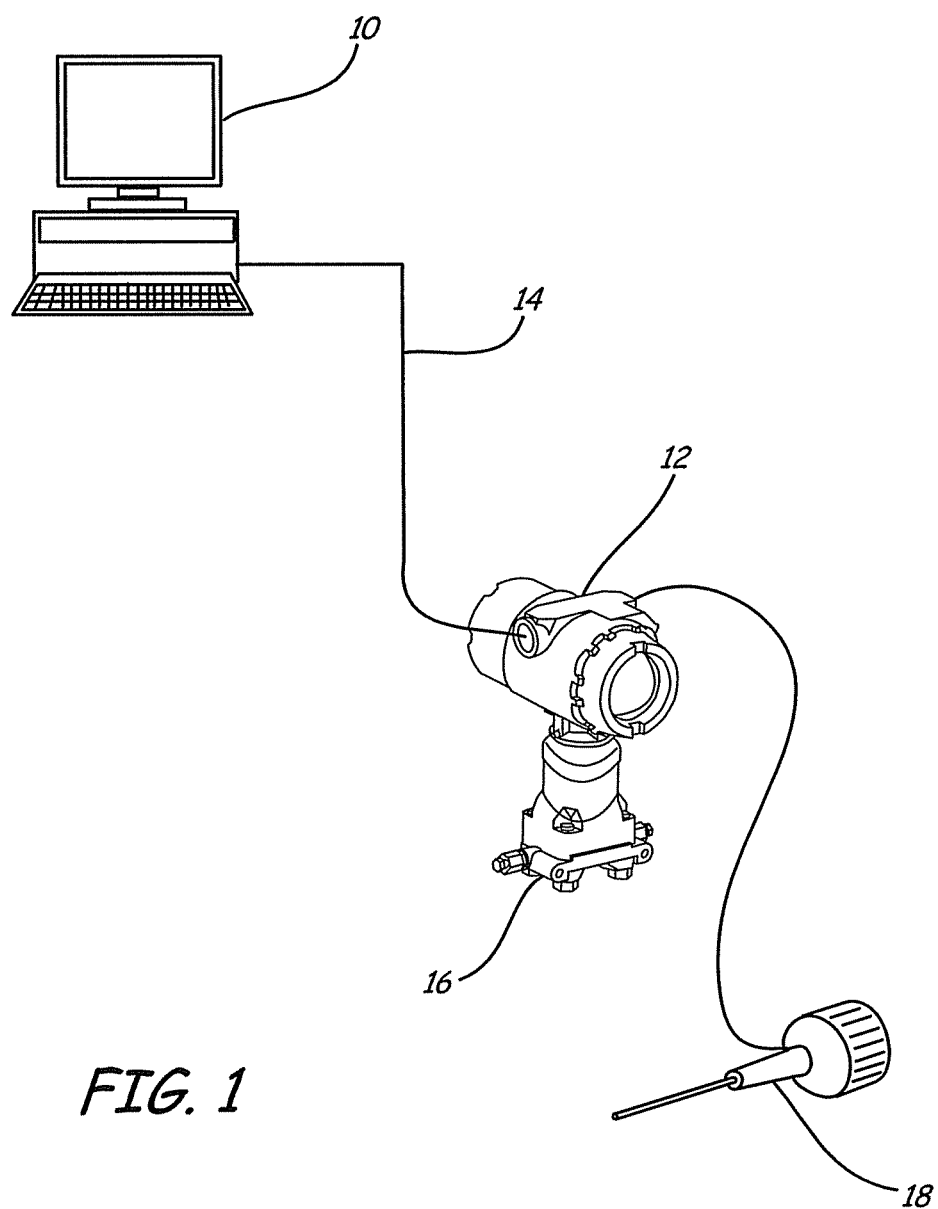
FIG. 1 is a diagrammatic view of a process fluid flow device coupled to a computer for initial configuration of the flow device.

Embodiments of the present invention generally employ a generalized energy per unit mass relationship that can be combined with mass flow to provide a generalized energy flow indication by a process fluid flow device. The energy flow can be given for a variety of different fluids for which the flow information is desired.

The heating value for natural gas applications is a constant with units of Btu/standard cubic foot (alternatively Btu/$lb_m$), or Megajoules/normal cubic meter (alternatively Megajoules/kg). To compute the energy flow rate in such applications requires multiplication of the mass flow rate by the constant heating value. This simple multiplication is trivial for a process fluid flow device and can easily be accomplished in modern multivariable flow devices.

For steam or water applications, the energy content, or enthalpy, of the fluid is a function of both the pressure and temperature of the fluid. To compute the energy flow rate requires the multiplication of the mass flow rate by the variable enthalpy. Equations for computing steam or water enthalpy are complicated and would typically tax the computing power available in relatively low power field devices. Consequently, it is preferable to approximate the enthalpy to simplify the computations. This can be done by using a two-dimensional polynomial approximation or, more preferably, by using a two-dimensional Chebychev polynomial approximation. It should be noted that the computation of the energy flow rate for steam or water still requires the mass flow rate since the Reynolds number is required for the primary element discharge coefficient calculation. Thus, the process for computing energy flow rate for steam requires the computation of mass flow rate (units of $lb_m$/unit time) as is done in existing multivariable transmitters and the independent calculation of enthalpy (Btu/$lb_m$). Multiplication of these two terms gives the energy flow rate in Btu/unit time.

In order to keep the process of calculating energy flow as simple and generic as possible, energy flow rate computation for natural gas is done in the same was as is done for steam. That is, a generic process involving the enthalpy (energy) as a function of pressure and temperature is used for all cases. Then, for the simpler case of energy flow for natural gas applications, the constant energy value (heating value) becomes a trivial implementation of the more comprehensive process. For steam applications, the enthalpy is typically desired in units of Btu/unit time. This means that the most efficient way of calculating the energy is energy per unit mass (i.e., Btu/$lb_m$ or Megajoules/kg). Then, the energy flow rate is energy per unit time obtained by multiplying the energy (Btu/$lb_m$) by the mass flow rate ($lb_m$/unit time). Since the natural gas industry typically prefers the heating value and units of energy/standard volume (i.e., Btu/standard cubic foot or Megajoules/normal cubic meter), the internal calculations are done in mass flow rate units but the display of heating value is converted by the field device to units of Btu/standard volume. This retains the general purpose of the process.

FIG. 1 is a diagrammatic view of a general purpose computer 10 operably coupled to process fluid flow device 12 through link 14. General purpose computer 10 can be any suitable computing device such as a desktop computer, laptop computer, or a mobile device. Computer 10 includes software installed thereon that facilitates initial configuration of field devices. One example of such software is sold under the trade designation Engineering Assistant from Emerson Process Management of Chanhassen, Minn. The Engineering Assistant software employs a process communication adapter, such as a HART® modem, or a FOUNDATION™ Fieldbus communication card. The adapter in computer 10 creates a process communication link 14 through which computer 10 allows a user or technician to interact with flow device 12. Flow device 12 is a multivariable field device that is able to measure a plurality of process fluid variables. Preferably, pressures are measured via manifold 16 and process fluid temperature is measured via temperature transducer 18. Coupled to a suitable differential pressure producer such as an orifice plate, the pressure measured on opposite sides of the orifice plate while the process fluid flows therethrough can be related to the process fluid flow rate in accordance known techniques.

During setup of flow device 12, the technician will typically configure a number of features of the field device. Such features can include all features previously configured in prior art Engineering Assistant software. Additionally, it is contemplated that certain flow characteristics can be mapped to certain process variable outputs. For example, flow rate can be provided as a first process variable output; differential pressure can be provided as a second process output; static pressure can be provided as a third process output; and finally, energy flow can be provided as a fourth process output. Further, during configuration of process fluid flow device 12, the technician can select various units for mass flow and/or volumetric flow. Further still, a technician can select the desired units for energy flow, such as Btu/h, Mjoule/h, Therms/d, et cetera. Additionally, the digital display, if provided on process fluid flow device 12, can be mapped to any suitable quantity, such as energy flow, mass flow, volumetric flow rate, differential pressure, gauge pressure, absolute pressure, process temperature, et cetera.

Figure 2:
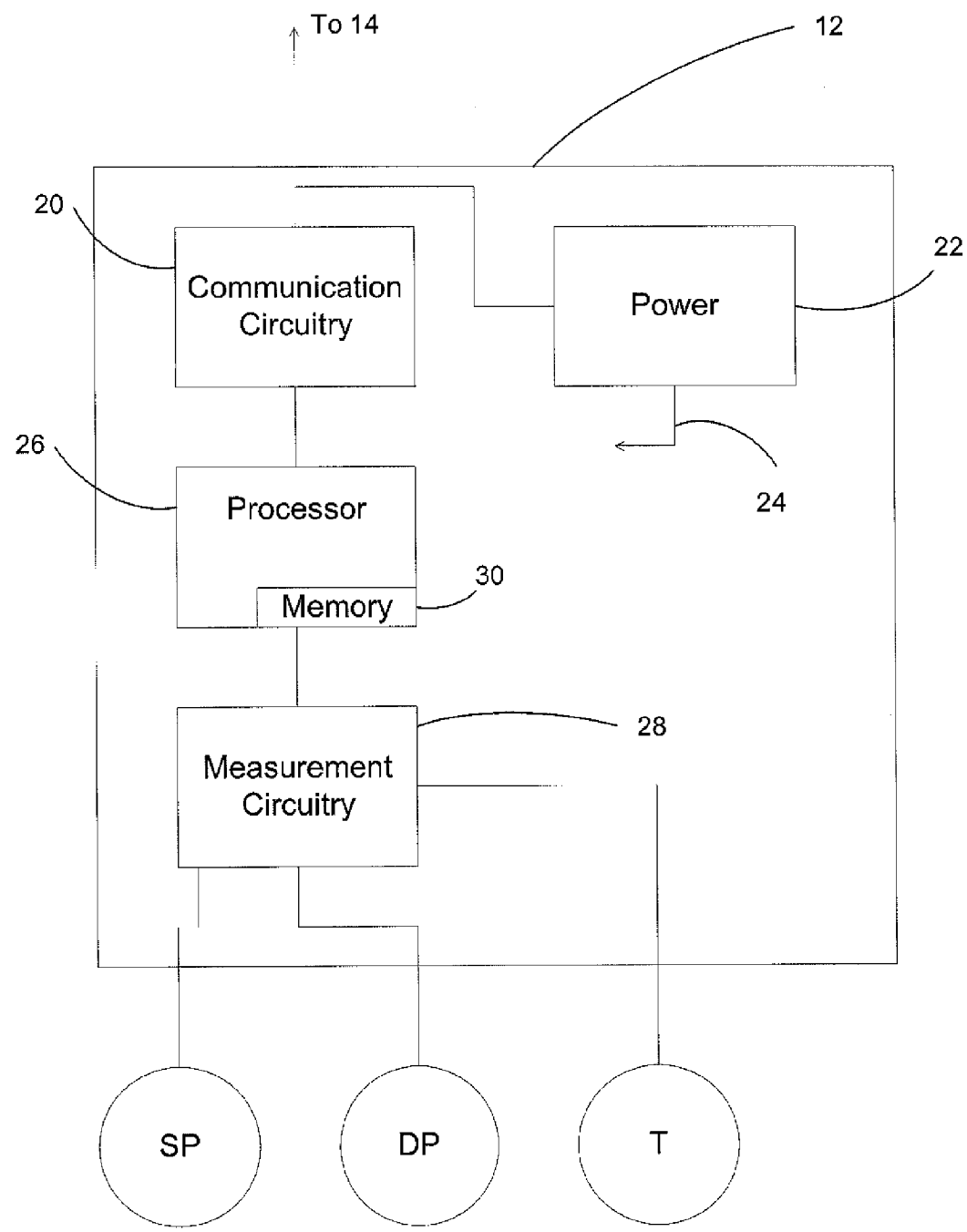
FIG. 2 is a block diagram of a process fluid flow device with which embodiments of the present invention are practicable.

FIG. 2 is a block diagram of process fluid flow device 12 with which embodiments of the present invention are particularly applicable. Device 12 includes communication circuitry 20 operably coupleable to process communication loop 14. Communication circuitry 10 allows device 12 to communicate in accordance with a suitable process industry communication protocol, such as the HART® protocol described above, the FOUNDATION™ Fieldbus protocol, or any other suitable process industry protocol. Device 12 also includes power module 22 that is preferably also coupleable to process communication loop 14. By coupling to process communication loop 14, device 12 may be able to operate wholly upon power received through the process communication loop. However, in some embodiments, power module 22 may be a power storage device, such as a battery or supercapacitor, and in such embodiments power module 22 need not couple to process communication loop 14. Power module 22 is configured to provide suitable electrical power to all components of device 12, as illustrated at reference numeral 24. Device 12 also includes a processor 26 which is preferably a microprocessor that is operably coupled to communications circuitry 20 and power module 22. Microprocessor 26 executes instructions stored in memory to obtain measurements from measurement circuitry 28 and calculates information based upon such measurements. For example, processor 26 preferably obtains measurements with respect to static process fluid pressure (SP), differential process fluid pressure DP, and process fluid temperature T and is able to provide or otherwise calculate a mass flow rate relative to process fluid flowing through a differential producer. As indicated in FIG. 2, processor 26 preferably includes memory 30 which is either part of processor 26 or an electrical component coupled to processor 26. Memory 30 preferably stores information that allows measured pressure and temperature to be related to energy content of the process fluid. Memory 30, accordingly, may include coefficients for a two-dimensional polynomial approximation or simply a lookup table that can relate measured static pressure (SP) and temperature (T) to energy content of the process fluid. In other words, memory 30 contains information to allow the computation of energy as a function of SP and T. By looking up or otherwise approximating energy content of the process fluid and calculating mass flow, processor 26 is able to communicate energy flow relative to the process fluid through communication circuitry 20. The utilization of a Chebychev polynomial is preferred with embodiments of the present invention since such Chebychev polynomial approximation can be implemented in a digital signal processing (DSP) chip using integer arithmetic which makes it a good candidate for low-power field device applications.

Figure 3:
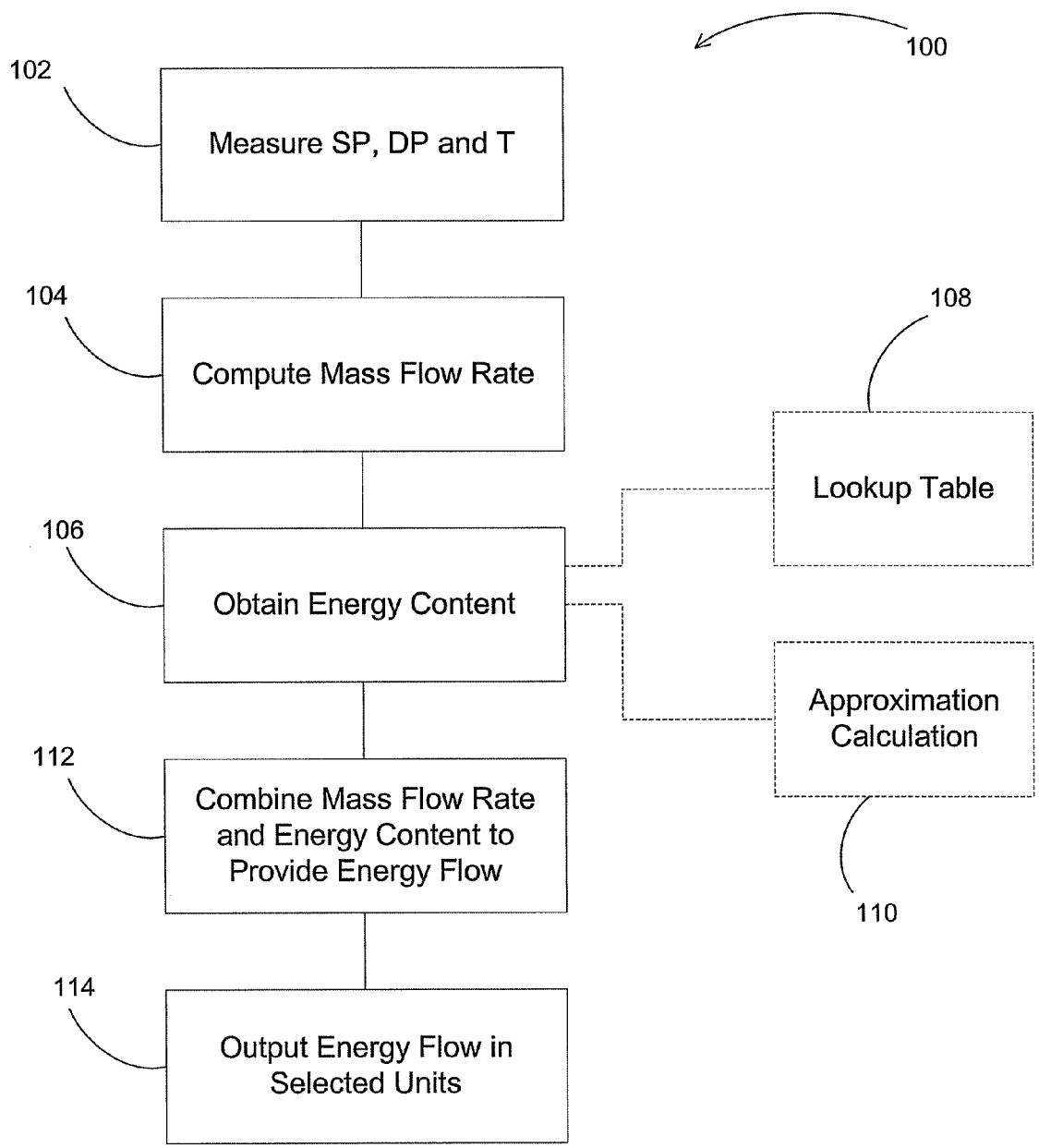
FIG. 3 is a flow diagram of a method of operating a process fluid flow device in accordance with embodiments of the present invention.

FIG. 3 is a flow diagram of a method of operating a process fluid flow device in accordance with an embodiment of the present invention. Method 100 begins at block 102 when a process flow device measures differential and static pressures DP, SP and process fluid temperature. While embodiments of the present invention are described with respect to measuring DP and SP, embodiments of the present invention can be practiced by measuring two absolute pressures and calculating differential pressure. Method 100 continues at block 104 where the process flow device calculates mass flow rate of the process fluid. This calculation can be done in accordance with any known techniques or methods, including those of the prior art. Method 100 continues at block 106 where energy content of the process fluid is obtained. Step 106 can include utilization of a lookup table 108 that stores energy content for various process fluids at various pressures and temperatures, or step 106 can include the utilization of an approximation calculation 110. One example of an approximation calculation is that listed above with respect to Chebychev approximation. Utilization of a Chebychev polynomial to compute a value related to flow is known. See U.S. Pat. No. 6,643,610 to Lowell A. Kleven et al. It should be noted that while embodiments of the present invention are generally described herein with respect to both natural gas and steam, embodiments of the present invention are applicable to any process fluids where the energy content can be expressed in terms of static or line pressure and temperature (including fluids where the energy content per unit mass is constant through variations of pressure and temperature) and an appropriate reference point can be defined.

Method 100 continues at block 112 where the mass flow rate, calculated in block 104, is combined with the energy content obtained in block 106 to provide an energy flow value. At block 114, the energy flow value is provided as an output in units that have been selected by a technician during process device configuration. This output can be provided locally by a display on the device, through a wired process communication loop, wirelessly, or any combination thereof.

Although the present invention has been described with reference to preferred embodiments, workers skilled in the art will recognize that changes may be made in form and detail without departing from the spirit and scope of the invention.

What is claimed is:

1. A process fluid flow device for measuring energy flow rate of a fluid comprising one of steam, water, or natural gas, the process fluid flow device comprising:
   a power supply module;
   process communication circuitry coupled to the power supply module;
   a processor coupled to the process communication circuitry and the power supply module;
   measurement circuitry operably coupleable to a temperature sensor, a static pressure sensor and a differential pressure sensor to measure an indication of differential pressure across a differential pressure producer and temperature of the fluid;
   memory containing data related to energy content of the fluid per unit mass of the fluid; and
   wherein the processor is coupled to the memory and configured to compute mass flow of the fluid as a function of measured temperature, static pressure and differential pressure of the fluid, determine an energy content per unit mass value of fluid using a polynomial equation and the data contained in the memory, and provide an energy flow rate output of energy per unit time based upon a multiplication of the mass flow times the energy per unit mass value;
   wherein the energy flow rate for steam, water and natural gas is calculated using the polynomial equation.

2. The process fluid flow device of claim 1, wherein the processor is a microprocessor.

3. The process fluid flow device of claim 1, wherein the data includes a lookup table.

4. The process fluid flow device of claim 1, including communication circuitry configured to provide the energy flow rate indication over a process communication loop.

5. The process fluid flow device of claim 4, wherein the communication circuitry is configured to provide at least one additional flow output over the process communication loop.

6. The process fluid flow device of claim 1, wherein the data relates process fluid static pressure and temperature to enthalpy.

7. The process fluid flow device of claim 6, wherein the data includes coefficients for a polynomial approximation of the enthalpy.

8. The process fluid flow device of claim 7, wherein the polynomial is a Chebychev polynomial.

9. The process fluid flow device of claim 1, wherein the energy per unit mass of the process fluid is a constant.

10. A method of measuring an energy flow rate of a fluid comprising one of steam, water or natural gas in a flowtube using a process fluid flow device, the method comprising:
    generating a differential pressure in the flowtube with a differential pressure producer;
    measuring the differential pressure across the flowtube with the process fluid flow device;
    measuring static pressure of the natural gas of the flowtube with the process fluid flow device;
    measuring temperature of the fluid in the flowtube with the process fluid flow device;
    calculating a mass flow rate of the fluid flowing in the flowtube based on the differential pressure, the static pressure and the temperature;
    determining an energy per unit mass value of the fluid or water and natural gas with the process fluid flow device using a polynomial equation based upon data contained in a memory; and
    calculating, using a processor of the fluid flow device, and communicating an energy flow rate by multiplying the mass flow rate times the energy per unit mass value of the fluid
    wherein the energy flow rate for steam, water and natural gas is calculated using the polynomial equation.

11. The method of claim 10, wherein calculating the process energy flow rate is done using a processor of a process fluid flow device.

12. The method of claim 10, wherein the calculating is an approximation based upon a Chebychev polynomial.

13. The method of claim 10, including communicating the process fluid energy flow rate over a process communication loop.

14. The method of claim 10, wherein determining the energy per unit mass value is performed using a lookup table stored in the memory.

* * * * *